United States Patent [19]
Harris et al.

[11] Patent Number: 5,395,282
[45] Date of Patent: Mar. 7, 1995

[54] METHOD AND APPARATUS FOR PROCESSING FISH FILLETS

[76] Inventors: Lane N. Harris, 1310 233rd Pl. SW., Bothell, Wash. 98012; Lloyd D. Ryan, Jr., 6711 57th Dr. NE., Marysville, Wash. 98270

[21] Appl. No.: 74,923

[22] Filed: Jun. 10, 1993

[51] Int. Cl.6 ............................................. A22C 17/00
[52] U.S. Cl. .................................. 452/170; 452/149; 452/160; 452/157; 452/180
[58] Field of Search ............ 452/170, 148, 149, 160, 452/161, 157, 180

[56] References Cited

U.S. PATENT DOCUMENTS

| Re. 33,904 | 4/1992 | Rudy et al. | 452/150 |
|---|---|---|---|
| 356,725 | 1/1887 | Moses | 452/149 |
| 692,824 | 2/1902 | Burleson | 452/171 |
| 2,110,416 | 3/1938 | David et al. | 452/170 |
| 2,140,575 | 12/1938 | David et al. | 452/170 |
| 2,288,010 | 6/1942 | Meland | 452/149 |
| 2,712,153 | 7/1955 | Berglund | 452/162 |
| 4,726,094 | 2/1988 | Braeger | 452/157 |
| 4,960,021 | 10/1990 | Carney et al. | 83/120 |
| 5,033,164 | 7/1991 | Miyazaki et al. | 25/14 |
| 5,061,221 | 10/1991 | Holzhüter et al. | 5/8 |
| 5,149,297 | 9/1992 | Braeger et al. | 25/16 |

FOREIGN PATENT DOCUMENTS

| 81993 | 6/1953 | Norway . |
| 642787 | 9/1958 | United Kingdom . |

*Primary Examiner*—Willis Little
*Attorney, Agent, or Firm*—Dowrey & Associates

[57] ABSTRACT

A fish fillet trimming device having a swing arm mounted rotary blade which rides on the surface of a moving conveyor table. The fish fillets are passed between the cutting blade and the conveyor surface for trimming blemished portions of the fillets. The method permits an inspector using an endless belt candling table to detect blemishes in the fillets and orient the fillets on the belt surface so as to pass beneath the trimming knife without removal of the fillets from the processing travel path.

34 Claims, 4 Drawing Sheets

METHOD AND APPARATUS FOR PROCESSING FISH FILLETS

BACKGROUND OF THE INVENTION

1. Field of the Invention

The present invention relates to the processing of fish fillets in preparation for marketing. More particularly, the invention relates to a method and apparatus for sorting and trimming fish fillets once they have been removed from the fish body and the skin removed from the flesh.

At present, the final processing of fillets is accomplished by loading the individual fillets either mechanically, by hand or a combination of both, onto a moving conveyor belt or candling table. The candling table-conveyor moves the relatively uniformly placed fillets past an inspection station for removal of substandard pieces and onto a discharge point where the fillets are collected for further handling e.g. packaging, freezing, or shipping. An inspector simply removes fillets which have any defects such as adhered pieces of skin, bones or any other blemish. As can well be appreciated, the skinless fish fillets at this point are a very expensive product because of the multiple processing steps they have gone through. Since the fillets are on a moving conveyor table, the inspector does not have an opportunity to remove and trim the unwanted portions from the fillets and hence the entire fillet is diverted from the conveyor for some other subgraded use. The commonly practiced processing method involves removing the blemished fillets from the conveyor table and depositing them into a discharge chute where they are collected and utilized for a product known as "surimi" which is a minced or ground substance used as a food additive. The fillets thus discarded must be sold at a price which is ofttimes only 30–50% of the going price for the prime fillets. It can well be appreciated, from the amount of fish processed in a single shift, that substantial losses are experienced in this final processing phase. The present invention provides a fillet trimming device which cooperates with the moving conveyor table to enable the inspector to manipulate and trim each blemished fillet without interrupting the product flow and without removing the fillet from the table. The method provides for the trimming of the blemished fillets in a manner such that the majority of the fillets continue as a prime product and only the blemished portion of the fillet is diverted to the surimi chute.

2. Description of the Prior Art

It is well known in the prior art to utilize rotary cutting blades for severing the muscle flesh of fish either initially to separate the fillets from the fish body or for the purpose of dividing or sectioning the fillet once it is removed. These prior art devices, however, involve the use of power driven cutting blades for severing the fish flesh which is supported and moved along by the conveyor device. One such example is the U.S. Pat. No. 5,061,221 to Holsuter et al which discloses a rather sophisticated device for sectioning or dividing fish fillets. In this apparatus, circular driven cutter blades are selectively positionable and activated for rotation to divide the fillets according to the desired geometric or volumetric properties. This apparatus contemplates the use of video cameras for assessing the properties of the irregular fillets and the use of a computer program for controlling the power driven knives.

U.S. Pat. No. 5,149,297 to Braeger et al; U.S. Pat. No. 2,140,575 and U.S. Pat. No. 2,110,416, both to E. David et al are examples of the use of power driven circular cutting blades for severing fish flesh to remove the fillets or sides from the fish. The rotary cutting blades in these patents are independently driven and maintained out of contact with any conveying device. U.S. Pat. No. 2,712,153 to Bergland discloses an alternative rotary fish cutting device utilizing power driven circular saws for the purpose of sectioning and boning the fish. U.S. Pat. No. 5,033,164 discloses the combined use of a driven circular filleting blade and mechanism for removing the dark colored flesh from the fish by a pressure process.

SUMMARY OF THE INVENTION

According to the present invention, a method for the final processing of prime fish fillets is made possible wherein skinless fillets are placed on a moving conveyor table and caused to move in a given plane along a travel path. The method contemplates trimming blemished portions of the individual fillets while still on the conveyor table by diverting the fillet to a second travel path which carries the selected blemished portion beneath a circular knife which rides on the conveyor table and is normally driven for rotation thereby. The weight of the circular knife device combined with the rotary blade configuration affects the cutting action with means being provided on the knife assembly to prevent relative movement between the rotary idler knife and the fish fillet.

In order to accomplish this process, a rotary knife assembly is mounted on swing arms connected to an overhead frame or the like which allows the rotary blade to be supported on the surface of the moving conveyor table and rotated thereby. The weight of the rotary blade assembly under the influence of gravity supplies the necessary cutting force on the blade to sever the fish flesh. The rotary knife blade is provided with side mounted drums of a substantial radius which allow only a very slight circumferential portion of the cutting edge to protrude beyond the drum surfaces. The side drums are formed with circumferential frusto conical surfaces inclined axially away from the blade edge for the purpose of enhancing the cutting and separating the two pieces. In addition, radially directed spurs or flexible dart tips are arranged about the periphery of a shoulder portion of each drum for the purpose of engaging and holding the fish fillet relative to the cutting blade to prevent slippage. The actual circumferential cutting edge of the blade is of such a slight radial extent that the conveyor belt surface is not penetrated and the danger of hand injuries is avoided.

DESCRIPTION OF THE PREFERRED EMBODIMENT

Figure 1:
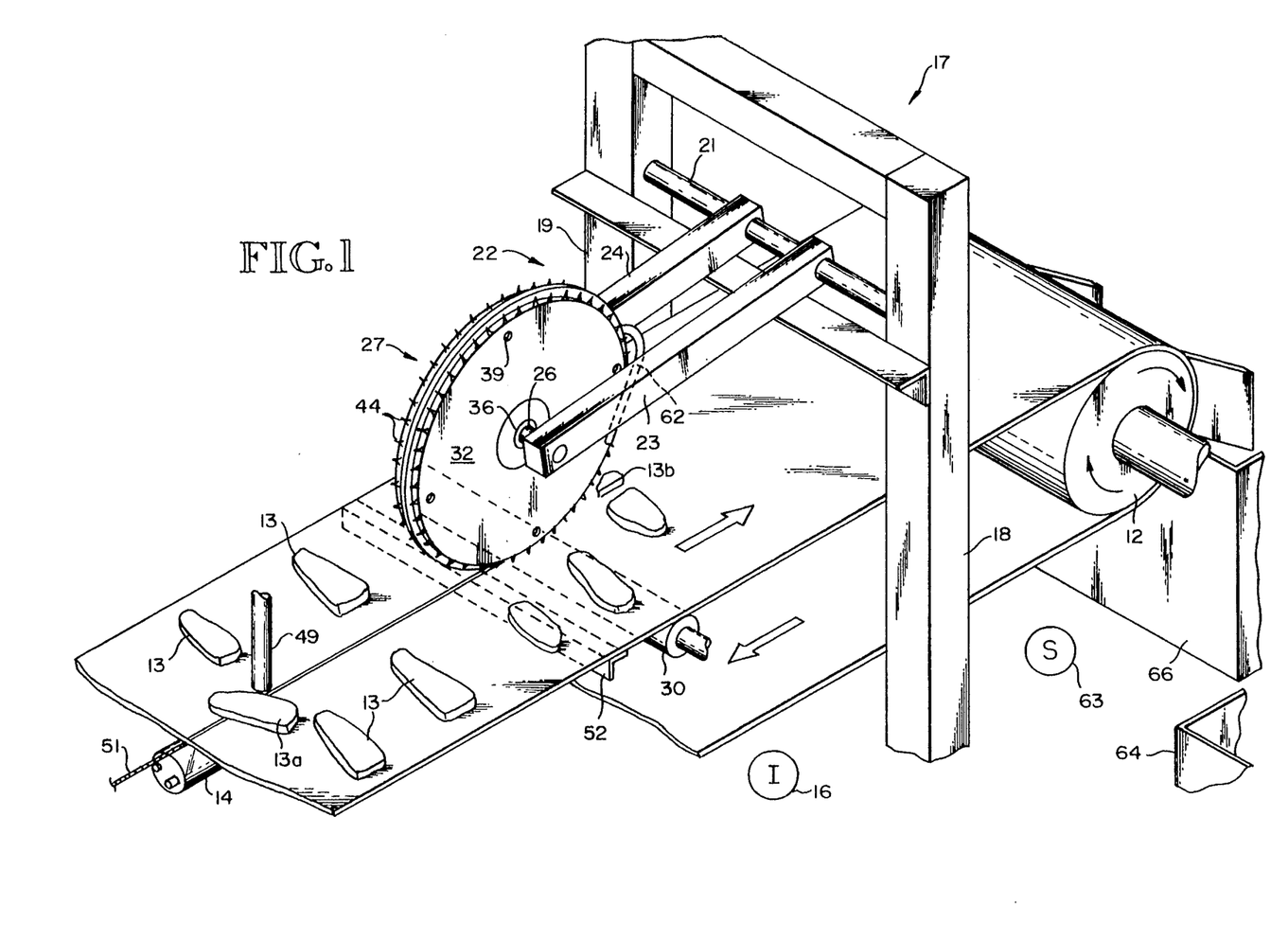
FIG. 1 is a perspective view of the fish processing conveyor table with the fillet trimming wheel thereon.

FIG. 1 illustrates a section of a fish fillet conveyor, indicated generally at 10, which may be of any number of well known designs used in the industry for inspecting and sorting fish fillets. The conveyor is shown schematically and will include an endless flexible belt type conveyor table 11 which may be driven by any motor means (not shown) and drive rollers such as shown at 12 on the discharge end. The belt moves the fillets 13 in a travel path in the direction indicated by the arrow in FIG. 1. The conveyor belt 11 is of the type designed to hold up under operating conditions peculiar to fish processing plants and will be understood to be translucent so as to allow light rays emitted from a light source, such as the tube or tubes 14, to pass. The conveyor belt thus becomes a moving candling table which allows an inspector at a station 16 to examine each fillet, which is also translucent, for blemishes on both sides without removal from the table. It will be understood that the conveyor belt or table 11 is driven at a constant speed which is compatible with inspection and with other on line processing apparatus.

The fish fillets 13 are understood to be prepared by removing the side fleshy portions of whole fish and will have the skin and any bones removed therefrom. Since mechanical apparatus for removing fish fillets cannot be entirely precise because of the irregularities in shapes and sizes of fish, some of the fillets 13 will contain blemishes, such as pieces of skin or attached bones, discolorations or the like. Even hand filleting processes are not entirely efficient and fillets are produced with the described defects. In any event, the preprocessed fillets are deposited on the conveyor table 11 and usually arranged in a generally uniform manner by an attendant with generally uniform spacing between the fillets, dependent upon the speed of the conveyor. The fillets will be generally aligned along one side of the conveyor table so as to move past an inspector who inspects each fillet at the station 16. The present embodiment illustrates a double sided sorting table suitable for handling a double line of fillets, an inspector being stationed on each side of the conveyor. The conveyor assembly may have any design of support structure including horizontal and vertical frame members.

An upright overhead mounting frame indicated generally at 17 is rigidly secured to the conveyor frame structure in any suitable manner and includes the mast members 18 and 19 on opposite sides of the conveyor. The mast members 18 and 19 provide a mounting means for the transverse shaft 21 which extends therebetween, overlying the conveyor table surface. The shaft 21 in the present embodiment will be understood to be fixed to the upright mast members 18 and 19 and provides a mounting means for the cutter blade assembly indicated generally at 22.

Figures 2, 3, 5:
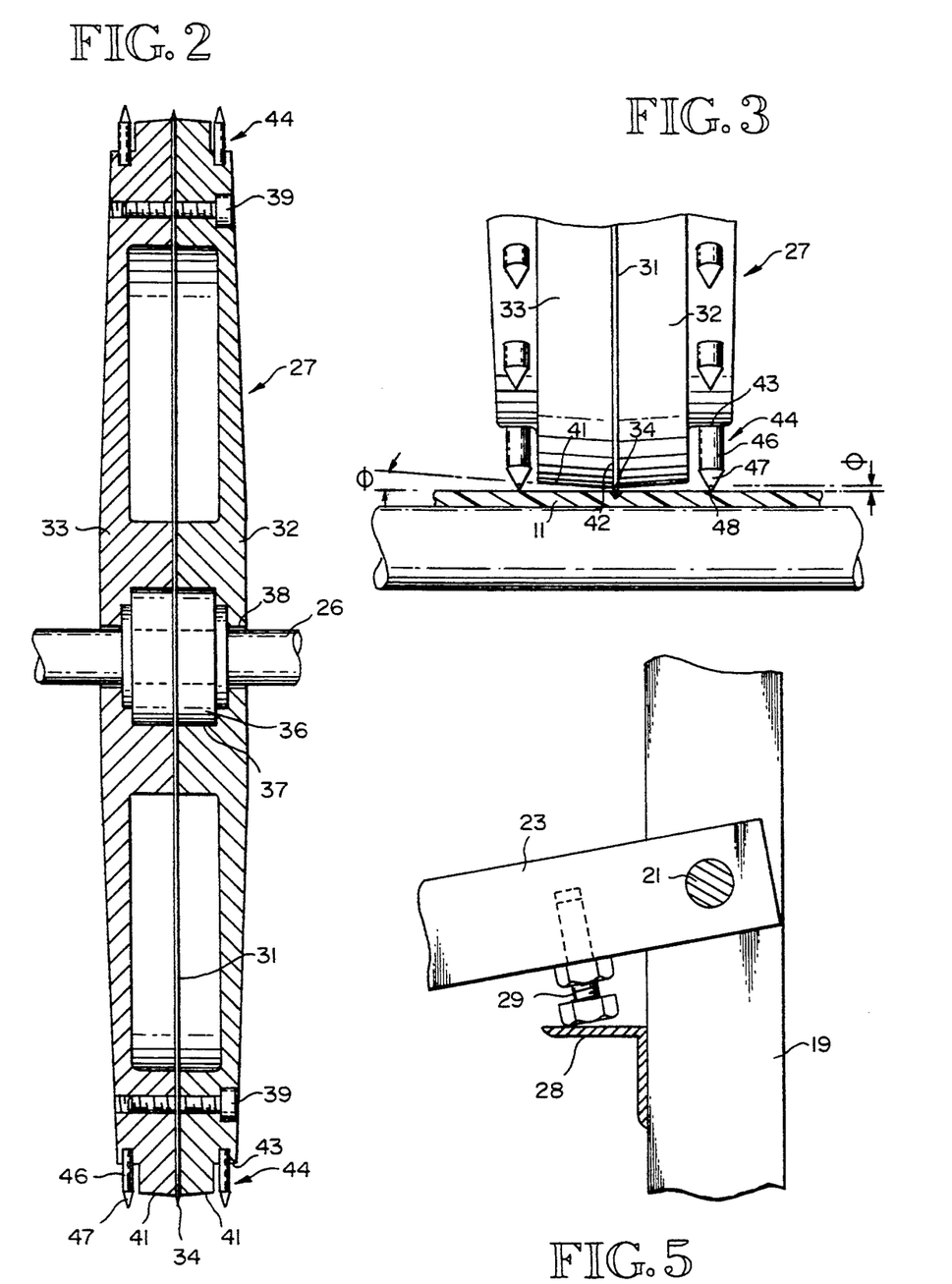
FIG. 2 is a cross sectional view of the cutter blade assembly.
FIG. 3 is an elevational detail illustrating the engagement of the cutter assembly with the conveyor surface.
FIG. 5 is an elevational detail showing the stop mechanism for the cutter assembly swing arms.

The cutter blade assembly 22 includes the swing arms 23 and 24 which are freely rotatably mounted on the cross shaft 21 at one end and provided with an axle shaft 26 extending between their opposite ends for the purpose of rotatably mounting the cutter wheel indicated generally at 27. As will be presently described in detail, the cutter wheel is a composite structure which is freely rotatable on the cross shaft 26 by any suitable bearing means. With the structure thus far described, it will be apparent that the cutter wheel 27 will contact and freely ride on the surface of the conveyor belt or table 11 by virtue of its swing arm mounting so as to be normally driven by its contact with the surface of the belt and will be held in its rotating position by the force of gravity. Referring to FIG. 5, a rotational stop for one or both of the swing arms 23 and 24 may be provided to prevent excess cutting pressure on the conveyor belt. To this end, a cross support bar such as the angle iron 28 is connected between the mast members 18–19 to provide a contact surface for the adjustable bolt members 29 threaded into the underside of the swing arm. In order to provide a rigid support for the flexible conveyor belt 11 a transverse idler roller 30 may be mounted by the conveyor side frame members (not shown). The roller 30 extends completely across and underneath the belt at the point of contact of the blade of the cutter wheel presently to be described.

The structural details of the cutter wheel assembly are shown in FIGS. 2 and 3. The assembly includes the circular cutting blade 31 which has fixed thereto first and second identical side drum members 32 and 33. As shown most clearly in FIG. 2, the blade comprises a circular disc having an annular cutting edge 34. In practice the blade may have a diameter in the neighborhood of approximately 16 inches but this may be varied. The blade is mounted on a hub 36 which houses a conventional bearing of any design which permits free rotation of the blade on the axle shaft 26.

Since the side drums are identical, only one such drum will be described in detail with the understanding that the description applies to both drums. As seen most clearly in FIG. 2, each drum member may be a hollow cast or molded structure having an axial recessed area 37 for receiving the hub 36 and an axial bore 38 for engaging the axle shaft 26. The drum may be hollow with inner annular surfaces for engaging the one side of the blade. The drums are secured against rotation relative to the blade 31 by means of fasteners such as cap screws 39. It will be understood that any alternate form of attachment of the drums 32 and 33 to the blade will suffice as long as the drums are caused to rotate with the blade. Each of the drums has a frusto conical annular surface 41 which is inclined in an axial direction away from the blade 31. The angle of inclination $\phi$ between the surfaces 41 and a plane at right angles to the plane of the blade 31 as shown in FIG. 3 is instrumental in effecting the cut made by the blade. Under the weight of the cutter wheel assembly and contact by the surfaces 41, the fish flesh is highly compressed and, due to the inclined nature of the surfaces 41, the flesh is tensioned beneath the blade such that the slightest contact by the blade edge causes separation of the two parts. It will be understood, of course, that the exact number of degrees of the angle $\phi$ may be varied depending on factors such as the weight of the assembly and the nature and consistency of the fish flesh or other material being cut. In any event, a very small angle of inclination is preferred and will provide sufficient tensioning for most purposes and also a greater degree of safety is provided since exposure of the cutting blade is held to a minimum. Angles in the range of 1°–10° have been used with satisfactory results for species of white fish meat such as pollock. The distance $\theta$ between the inner annular edge 42 of the conical surfaces 41 and the cutting edge 34 is preferably in the range of from 0.020–0.040 inches for a purpose presently to be described.

In addition to the structure described, each of the drums 32 and 33 include an annular shoulder or offset surface 43 which provides a mounting surface for mounting the circumferentially spaced spurs or dart tips 44. These dart tips are identical in structure and may comprise a cylindrical flexible shaft 46 with a pointed end 47. These dart tips may be anchored by screw threading into the surfaces 43 as illustrated in FIG. 2. It will also be noted from the detail in FIG. 3 that the pointed ends 47 of the dart tips extend radially beyond the cutting edge 34 of the blade. With this arrangement, a fillet passing between the edge of the cutter blade and the top surface of the conveyor table 11 will be engaged by the flexible dart tips which bend or deflect, as at 48, and hold the fillet as the cutting wheel rolls across its surface. The fillet, of course, is conveyed along by the belt 11. The cutting action thus obtained is caused by the blade edge 34 under the vertical pressure of the weight of the cutting wheel as it, in effect, rolls across the surface of the fillet. The inclined surfaces 41 compress the meat fibers and the blade edge 34 severs the fibers thus tensioned. In this respect it will be noted that the cutter wheel assembly, including the cutter blade and side mounted drums, will normally be constructed from such material as stainless steel usually required in the food processing industry. The assembly will thus be of considerable weight so as to accomplish the function of crushing and tensioning the fibers of the fish flesh to enable the knife blade to make the separation. The overall width of the blade assembly including the side drums, although not critical, may be in the neighborhood of 1½–2 inches with the assembly preferably weighing in the neighborhood of 40–50 pounds although this may be varied in order to obtain the proper pressures for any given type of fish fillets. The desired weight of the cutter wheel assembly may be conveniently controlled by the weight and configuration of the two side drums.

Figure 4:
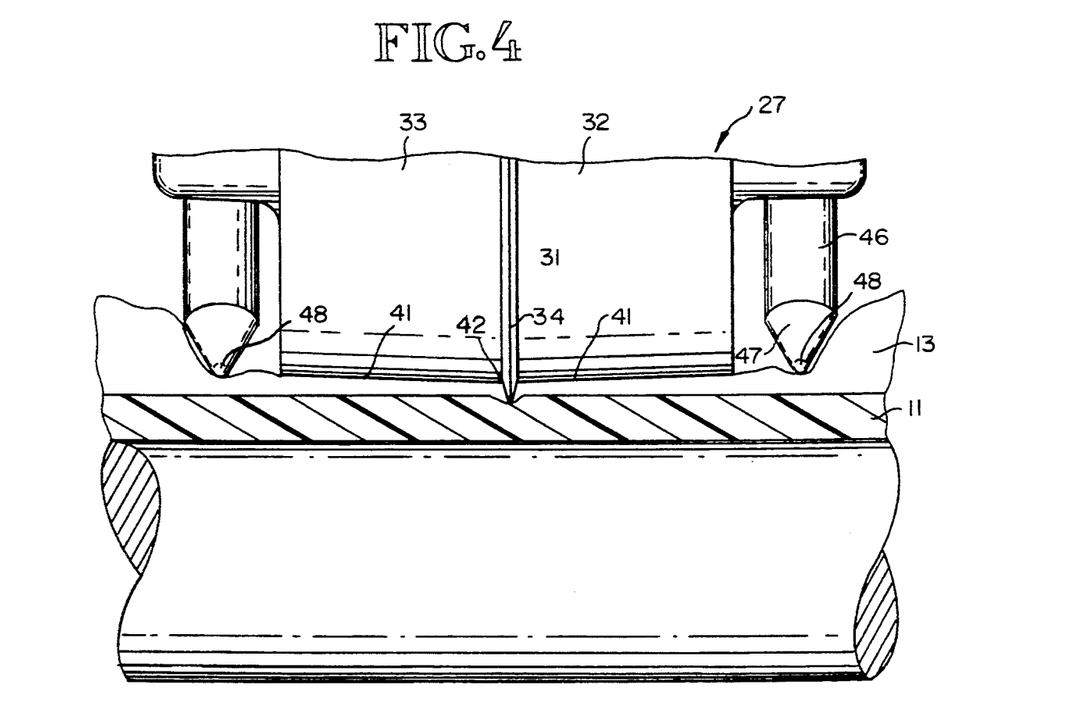
FIG. 4 is an elevational detail illustrating the cutting action of a fish fillet.

The translucent flexible conveyor belt 11 is well known in the art and widely utilized in fish processing plants. The belt may be made of a single ply thermoplastic material having the required physical properties of flexibility and translucency. Typically, these belts range in overall thickness of from 2–4 millimeters and are resistant to abrasion as well as knife cuts commonly experienced in fish handling lines. The surface durometer of the belt suitable for this invention should be chosen such that the combined effect of the weight of the cutting wheel assembly and contact with the sharpened blade edge will not penetrate the belt surface. These belts have surface memory and only a temporary indentation, such as illustrated in FIGS. 3 and 4, at the point of contact with the knife edge will result. One such belting is sold under the name THERMO-KING ® which is a special blend of DuPont Hytrel ® resin sold by Sifferman's Supply Company of Seattle, Wash. Although this particular belting is described by way of example, it will be understood that any belting which has the ability to resist cutting by the trimming blade and is otherwise compatible with fish processing uses will suffice for the present invention.

Referring to FIG. 1, a fillet diverter 49 may be mounted overhead of the conveyor belt in line with the cutter blade assembly and upstream therefrom in the direction of conveyor travel. The fillet diverter 49 in the example shown in FIG. 1 may constitute a vertical rod or the like supported by any means of overhead structure (not shown) fixed relative to the conveyor. The diverter functions to prevent a misplaced or misaligned fillet, such as the fillet 13a, from passing beneath the cutter wheel when undetected by the inspector. In order to provide the inspector with a visual guide for the exact placement of a blemished portion of a fillet to be trimmed, a taut line 51 is stretched beneath the conveyor belt parallel to the central axis of the conveyor belt and in line with the cutting edge of the blade. Since the taut line 51 is between the underside of the conveyor belt and the light source 14, a shadow line is created on the belt. The shadow line is visible to the inspector and permits accurate placing of the fillet to be cut at a desired location. This line 51 may be stretched between suitable cross members such as the angle iron 52 which will be understood to be fixedly connected to the conveyor frame in any suitable manner.

Figure 7:
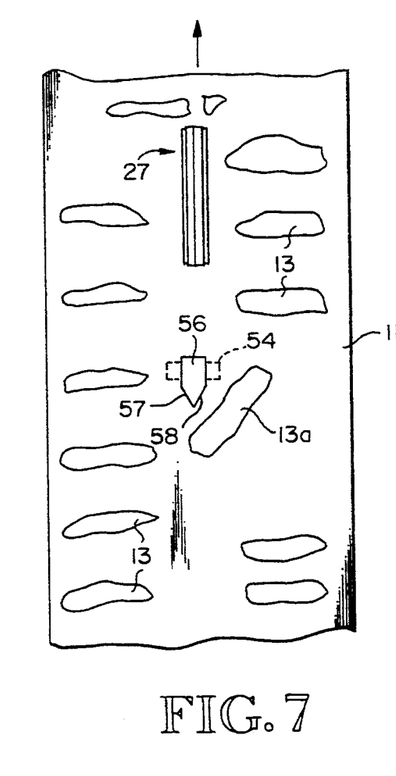
FIG. 7 is a top plan view of a modified fillet diverting device.
Figure 8:
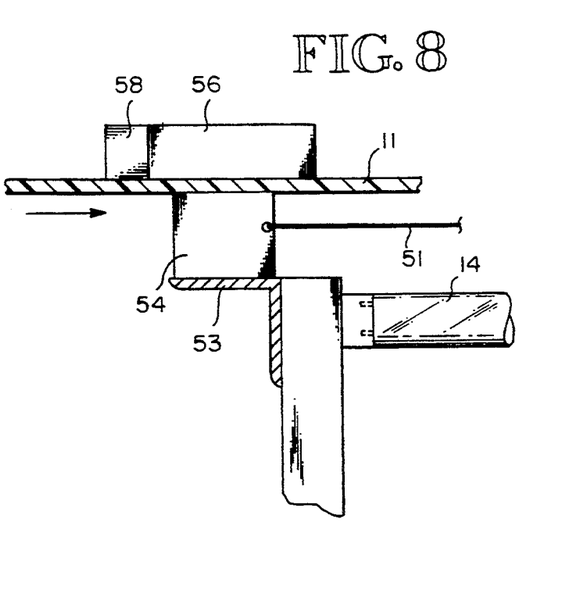
FIG. 8 is a partially sectioned side elevational view of the fillet diverting device of FIG. 7.

FIGS. 7 and 8 illustrate a modification of the fillet diverter wherein a subframe structure, which includes a transverse support such as the angle iron 53, is located beneath the conveyor belt 11 upstream from the cutter wheel assembly and mounts a permanent magnet 53. The magnet 53 is stationary and may contact the underside of the moving belt 11 and also provide an anchor point for the taut line 51 as illustrated. A free-floating deflector 56 made of ferrous material is placed on the surface of the moving belt 11 and is held in a fixed position by the permanent magnet 54 beneath the belt. Since the belt is composed of a non-ferrous material and has a smooth non-porous non-sticking surface, the belt will pass between the deflector and magnet allowing the deflector to remain in position over the magnet. The deflector 56 may have a wedge shape construction with angled leading surfaces 57 and 58 which will serve to deflect a misplaced or misaligned fillet 13a out of the cutting line of the knife.

Figure 6:
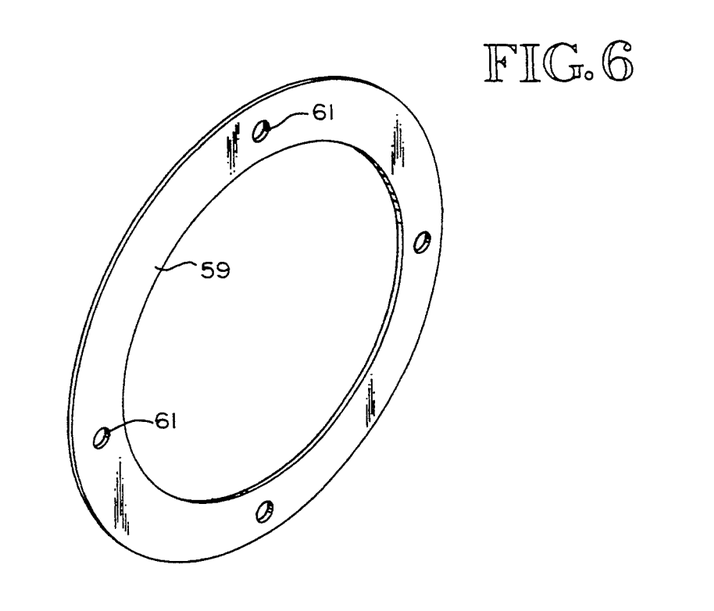
FIG. 6 is a perspective view of a modification of the cutter blade.

FIG. 6 illustrates a modification of the cutter blade which embodies the annular ring 59. The ring may be clamped between the side drums 32 and 33 by means of the drill holes 61 designed to receive the cap screws 39 as illustrated in FIG. 2. It will be understood, of course, that the side drums 32 and 33 suitable for use with the annular ring blade will be fixedly attached to the hub 36 by such means as cap screws or the like (not shown). The blade edge configuration and its cooperation with the two side drums will be understood to be exactly the same as described with relation to the FIG. 2 embodiment.

Referring to FIG. 1, a device for insuring the removal of any fillet or fillet piece which may adhere to the rotating cutter wheel assembly is provided. The removal device may take the form of a U-shaped rod or bar 62 which is fixed at its opposite ends to the swing arms 23 and 24 and passes about the peripheral edge of the backside of the cutter wheel assembly. Thus any fillet or fillet piece adhering to the blade or dart tips which rides up on the backside of the wheel will be contacted and removed by the bar 62 and merely fall back onto the moving conveyor to be handled in the usual manner. Although the member 62 is shown in a form of a U-shaped rod, it will be understood that any structural member which will serve to remove any adhered piece of fish from the back side of the rotating wheel will suffice for this purpose.

The processing method according to the present invention contemplates the feeding of serially placed fillets in a travel path on a moving candling table. An inspector at the station 16 in FIG. 1 visually inspects the translucent fillets and thus detects the presence of any blemish or substandard portions as the fillets move in the travel path. The inspector when spotting a blemished portion of a fillet moves the fillet to the shadow line created by the taut line 51 so that the fillet is in a position to be severed along the shadow line. This may be done without actually moving the fillet from the conveyor table and, since the fillet is positioned well in front of the cutting wheel, the inspector's hands never approach the vicinity of the cutting blade. As the fillet continues to travel, it passes beneath the cutting wheel and, since the belt is backed by the roller 30, is in effect squeezed between the cutting wheel and the belt by the weight of the wheel. This action serves to tension the meat fibers which are then easily separated by the exposed blade edge. The angled surfaces of the side drums perform the fiber tensioning function which facilitates the cutting action requiring no more than a few thousandths of an inch of blade exposure. The severed fillet continues along the travel path and an attendant or "scooper" at the station 63 removes the prime fillets and partial fillets without blemishes from the conveyor table and may deposit them in a container or the like 64 for freezing, packaging or further handling. The blemished portions such as the portion 13b continues on and is passed over the discharge end of the conveyor belt into a chute 66 for use as surimi or the like. The method according to the present invention thus allows a significantly greater proportion of the fillets to be utilized as a prime product.

The present invention has been described with reference to a preferred embodiment and certain modifications. Further modifications and alterations may become apparent to one skilled in the art upon reading and understanding this specification. It is intended to include all such modifications and alterations within the scope of the appended claims.

What is claimed is:

1. A fish fillet cutting apparatus comprising, in combination;
    a conveyor having a generally flat surface for moving serially arranged fish fillets along a travel path, and
    a freely rotatable circular cutting knife located in said travel path supported on and driven for rotation by the surface of said conveyor,
    whereby fish fillets on the surface of said conveyor passing beneath said cutting knife are severed thereby.

2. The apparatus according to claim 1 including;
    pressure means mounted in conjunction with said blade to vertically compress and laterally tension the fish fiber in the area of contact with said blade.

3. The apparatus according to claim 2 including;
    spur means mounted in conjunction with said blade to engage said fillets and prevent slipping action relative to said blade.

4. The apparatus according to claim 3 wherein said conveyor comprises a translucent belt, said apparatus including;
    a light source mounted beneath the belt, and
    means mounted between said belt and said light source for casting a shadow line on said belt visible from above the belt,
    said shadow line being aligned with the longitudinal axis of the belt and intersecting the point of contact between the cutting knife and the surface of the belt.

5. Apparatus for processing fish fillets comprising, in combination;
    conveyor means for supporting and moving serially arranged fish fillets in a uniform travel path in a given generally horizontal plane,
    said fillets being arranged in spaced relation on a first surface area of said conveyor means,
    a freely rotatable circular cutting blade,
    mounting means for mounting said cutting blade in overlying relation with said conveyor and in pressured contact with a second surface area thereof defining a cutting point normally out of contact with said fillets,
    said mounting means including swing arm means rotatably connected to said cutting blade at one end for free rotation of said blade,
    whereby said cutting device is supported and normally driven for rotation by the moving conveyor surface and held thereon by the force of gravity, said fillets being cut by passing beneath said cutting device.

6. The apparatus according to claim 5 wherein said conveyor means includes a generally horizontally disposed flexible conveyor belt having top and bottom surfaces,
    said cutting blade being in contact with the top surface of the conveyor belt, and
    support means contacting the bottom surface of said conveyor belt in the area of contact of said cutting blade to support the weight thereof.

7. The apparatus according to claim 5 including;
    pressure means carried on said swing arms to vertically compress and laterally tension the fish fiber in the area of contact with said blade.

8. The apparatus according to claim 7 including;
    spur means carried on said swing arms movable with said cutting blade to engage said fillets and prevent slipping action relative to said blade.

9. Apparatus for processing fish fillets comprising, in combination;
    conveyor means including a rigid frame and a generally horizontally disposed translucent flexible conveyor belt having top and bottom surfaces for supporting and moving serially arranged fish fillets in a uniform travel path in a given generally horizontal plane,
    said fillets being arranged in spaced relation on a first surface area of said conveyor means,
    a freely rotatable circular cutting blade,
    mounting means including an overhead support structure connected to said conveyor frame for mounting said cutting blade in overlying relation with said conveyor in contact with the top surface of said conveyor at a second surface area thereof defining a cutting point normally out of contact with said fillets,
    said mounting means including swing arm means pivotally supported by said overhead structure and rotatably connected to said cutting blade at one end for free rotation of said blade,
    support means contacting the bottom surface of said conveyor belt in the area of contact of said cutting blade to support the weight thereof,
    a light source mounted beneath the bottom surface of said conveyor belt, and
    means mounted between said bottom surface and said light source for casting a shadow line on said conveyor belt visible from the top surface thereof, said shadow line being aligned with the longitudinal axis of said conveyor belt and intersecting the point of contact between the cutter blade and the top surface of the conveyor, whereby said cutting blade is supported and normally driven for free rotation by the moving conveyor surface and held thereon by the force of gravity, said fillets being cut by passing beneath said cutting blade.

10. The apparatus according to claim 9 including stop means acting between said swing arms and said support structure for limiting the downward swinging movement of said arms.

11. The apparatus according to claim 9 including;

fillet removal apparatus mounted adjacent the peripheral edge of said cutting blade for removing fillet material adhering to said cutting device subsequent to the cutting actions, means mounting said removal apparatus adjacent a point on the periphery of said cutting device which causes the removed material to fall to the conveyor surface downstream from the point of contact between the cutting device and the conveyor surface.

12. The apparatus of claim 9 including;

fillet diverter means mounted adjacent the top surface of the conveyor belt, upstream from the cutting point in the area of said shadow line to divert misaligned fillets from passing beneath said cutting blade.

13. The apparatus according to claim 12 whereon said diverter means comprises;

a vertical post member, and means to mount said post member in a fixed position above and closely adjacent the top surface of the conveyor belt.

14. The apparatus according to claim 12 wherein conveyor belt is non-ferrous material and said diverter means comprises;

a support block mounted in close proximity to the bottom surface of said conveyor belt upstream from the cutting point in the area of said shadow line, a free-floating diverter block riding on the top surface of said conveyor belt directly above said support block, for diverting misaligned fillets from passing beneath said cutting blade, at least one said support block and diverter block comprising a permanent magnet and the other being composed of ferrous material, whereby said diverter block will remain directly above said support block and the non-ferrous belt will pass therebetween.

15. A fish flesh cutting apparatus for cooperation with a moving fish conveyor surface comprising;

a circular cutting knife blade contacting said conveyor surface, mounting means for mounting said blade for free rotation by and support on said conveyor surface, first and second circular side drums carried by said mounting means and positioned on opposite sides of said knife blade for rotation therewith, each said drum means including a circumferential frusto conical surface axially inclined away from said blade for contacting the surface of a fish fillet, annular shoulder means on each said drums remote from said blade, and circumferentially spaced spur members on each said shoulder means extending radially outwardly therefrom, whereby said spur members engage and prevent movement of a fillet relative to said knife blade and said conveyor surface when passing therebetween.

16. The device according to claim 15 wherein each said conical surfaces includes an inner circumferential edge in engagement with the cutting blade, said blade including a circumferential edge comprising a cutting edge, said cutting edge being located a radial distance beyond said inner circumferential edges of said conical surfaces.

17. The fish cutting apparatus according to claim 16 wherein;

said knife blade comprises an annular ring fixed between said side drums for rotation therewith.

18. The device according to claim 16 wherein said cutting edge is located a radial distance beyond said inner circumferential edges of the conical surfaces a distance in the range of 0.020–0.040 inches.

19. The device according to claim 16 wherein the angle of inclination of said conical surface from a plane normal to said blade is in the range of $1°–10°$.

20. The fish cutting apparatus according to claim 15 wherein;

said knife blade comprises an annular ring having a cutting edge on the outer periphery thereof, said annular ring being fixed between said side drums for rotation therewith, the cutting edge thereof extending a radial distance beyond the adjacent circumferential edge of each said drums.

21. A method for processing fish fillets for removal of blemishes including the steps of;

conveying said fillets arranged serially on the top surface of a translucent conveyor candling table in a given normal travel path, mounting a cutting blade on the surface of said conveyor spaced from the normal travel path of said fillets, inspecting said fillets for blemished areas, and diverting fillets with blemished areas from said normal travel path beneath said cutting blade for severing the blemished areas without removal of the fillet from the top surface of said conveyor.

22. The method according to claim 21 including the step of compressing the meat fibers of said fillets in a vertical direction and tensioning the fibers in a lateral direction in the area of said blemish simultaneously with the severing action of said blade.

23. The method according to claim 22 wherein said cutting blade comprises a freely rotatable circular blade supported on the surface of said table and driven for rotation thereby.

24. The method according to claim 23 wherein said circular blade is provided with side drums having inclined conical surfaces for contacting and tensioning the meat fibers of the fillet in a lateral direction, the weight of said blade and side drums serving to compress the meat fibers.

25. A method for processing fish fillets for removal of blemishes including the steps of;

conveying said fillets on the top surface of a conveyor table in a given normal travel path, mounting a cutting blade in pressure contact with the surface of said conveyor spaced from the normal travel path of said fillets, inspecting said fillets for blemished areas, and diverting fillets with blemished areas from said normal travel path beneath said cutting blade for severing the blemished areas without removal of the fillet from the top surface of said conveyor.

26. A method for trimming fish fillets including the steps of;

conveying said fillets on the top surface of a conveyor table in a given normal travel path, mounting a cutting blade for pressured contact with the surface of said conveyor spaced from the normal travel path of said fillets, inspecting said fillets for trimming purposes, and diverting fillets to be trimmed from said normal travel path beneath said cutting blade for severing the areas to be trimmed without removal of the fillet from the top surface of said conveyor.

27. The method according to claim 26 including the step of compressing the meat fibers of said fillets in a vertical direction and tensioning the fibers in a lateral direction in the area to be trimmed simultaneously with the severing action of said blade.

28. The method according to claim 27 wherein said cutting blade comprises a freely rotatable circular blade supported on the surface of said table and driven for rotation thereby.

29. The method according to claim 28 wherein said circular blade is provided with side drums having inclined conical surfaces for contacting and tensioning the meat fibers of the fillet in a lateral direction, the weight of said blade and side drums serving to compress the meat fibers.

30. The method according to claim 29 wherein said conveyor comprises a translucent candling table.

31. The method according to claim 30 including the step of holding said fillet against slipping action relative to said blade as the blade moves thereacross.

32. A method for cutting fish including the steps of;

conveying individual fish pieces on the top surface of a conveyor table in a given travel path, mounting a freely rotatable circular cutting blade in pressured contact with the surface of said conveyor to be normally rotated thereby, passing said fish piece on the conveyor surface beneath said blade to be severed thereby.

33. The method according to claim 32 including the step of compressing the meat fibers of said fish piece in a vertical direction and tensioning the fibers in a lateral direction simultaneously with the severing action of said blade.

34. The method according to claim 33 including the step of holding said fish piece against slipping action relative to said blade as the blade moves thereacross.

* * * * *

UNITED STATES PATENT AND TRADEMARK OFFICE
CERTIFICATE OF CORRECTION

PATENT NO.    : 5,395,282
DATED         : Mar. 7, 1995
INVENTOR(S)   : Lane N. Harris; Lloyd D. Ryan, Jr.

It is certified that error appears in the above-identified patent and that said Letters Patent is hereby corrected as shown below:

Col 7, Line 62  change "between-said" to --between said--

Signed and Sealed this

Thirteenth Day of June, 1995

Attest:

BRUCE LEHMAN

Attesting Officer

Commissioner of Patents and Trademarks